US011607955B2

(12) United States Patent
Tomioka

(10) Patent No.: US 11,607,955 B2
(45) Date of Patent: Mar. 21, 2023

(54) WORK VEHICLE

(71) Applicant: ISEKI & CO., LTD., Ehime-ken (JP)

(72) Inventor: Eiji Tomioka, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 238 days.

(21) Appl. No.: 17/070,364

(22) Filed: Oct. 14, 2020

(65) Prior Publication Data
US 2021/0197663 A1     Jul. 1, 2021

(30) Foreign Application Priority Data

Dec. 26, 2019  (JP) .............................. JP2019-236886

(51) Int. Cl.
| B60K 26/02 | (2006.01) |
| B60K 15/063 | (2006.01) |
| B60K 17/10 | (2006.01) |
| B62D 25/20 | (2006.01) |
| B62D 49/06 | (2006.01) |
| F16H 39/00 | (2006.01) |
| F16N 21/02 | (2006.01) |

(52) U.S. Cl.
CPC ............ *B60K 26/02* (2013.01); *B60K 15/063* (2013.01); *B60K 17/10* (2013.01); *B62D 25/20* (2013.01); *B62D 49/0692* (2013.01); *B60K 2015/0634* (2013.01); *F16H 39/00* (2013.01); *F16N 21/02* (2013.01)

(58) Field of Classification Search
CPC ............ B60K 26/02; B60K 2015/0634; B62D 25/20; B62D 49/0692; F16N 21/02
See application file for complete search history.

(56) References Cited

U.S. PATENT DOCUMENTS

| 2004/0174046 A1* | 9/2004 | Kamura | B62D 25/2036 296/193.07 |
| 2007/0138863 A1* | 6/2007 | Clark | B60K 26/02 303/125 |
| 2009/0242302 A1* | 10/2009 | Fujiki | B62D 25/10 180/89.12 |
| 2013/0043702 A1* | 2/2013 | Hettinger | B60K 1/04 903/903 |
| 2015/0107394 A1* | 4/2015 | Goto | G05G 13/00 74/479.01 |
| 2016/0039283 A1* | 2/2016 | Tomioka | B60K 20/04 192/225 |
| 2016/0089974 A1* | 3/2016 | Tanigawa | B60K 15/063 280/834 |
| 2016/0129783 A1* | 5/2016 | Tamura | B60K 15/067 180/344 |
| 2017/0015191 A1* | 1/2017 | Kurokawa | B60K 13/04 |

(Continued)

FOREIGN PATENT DOCUMENTS

JP     2017-178044 A     10/2017

*Primary Examiner* — Frank B Vanaman
(74) *Attorney, Agent, or Firm* — Finnegan, Henderson, Farabow, Garrett & Dunner LLP

(57) ABSTRACT

A tractor according includes a running vehicle body, a floor provided on the running vehicle body and serving as a floor surface of an operation part in which a driver is located, a floor bracket configured to support the floor, a fuel tank provided below the floor, and a pedal configured to move the running vehicle body forward or backward and having pivot shafts provided on the floor bracket between the floor and the fuel tank.

3 Claims, 4 Drawing Sheets

(56) References Cited

U.S. PATENT DOCUMENTS

2017/0015368 A1\* 1/2017 Miyazaki ............ B60H 1/00378
2018/0135748 A1\* 5/2018 Shoji ...................... B60K 20/04
2019/0111782 A1\* 4/2019 Mitani ................... B60K 26/02

\* cited by examiner

WORK VEHICLE

CROSS REFERENCE TO RELATED APPLICATIONS

This application claims priority to Japanese Patent Application No. 2019-236886, filed Dec. 26, 2019, the disclosure of which is incorporated herein by reference in its entirety.

BACKGROUND

The disclosure relates to a work vehicle.

There are work vehicles such as tractors in which an arm portion of a pedal is connected to a pivot shaft disposed below a floor and the pivot shaft is inclined so as to approach the rear of a vehicle body toward the side of the vehicle body (see, e.g., JP-A-2017-178044).

SUMMARY

Incidentally, recently, in a work vehicle such as a tractor, an exhaust gas treatment device may be arranged inside a bonnet and an installation position of a fuel tank may be displaced from the inside of the bonnet to the lower side of a floor in connection with exhaust gas regulations. In this configuration, it may be difficult to place a pedal as in the related art.

The invention has been made in view of the above situations, and an object of some embodiments of the disclosure may be to provide a work vehicle in which a pedal can be compactly arranged.

In order to address issued encountered in the related art and to achieve the object, a work vehicle according to one aspect of the disclosure includes a running vehicle body, a floor provided on the running vehicle body and serving as a floor surface of an operation part in which a driver is located, a floor bracket configured to support the floor, and a fuel tank provided below the floor. The work vehicle may include a pedal configured to move the running vehicle body forward or backward and having pivot shafts provided on the floor bracket between the floor and the fuel tank.

According to one aspect of the disclosure, the pedal can be compactly arranged.

DESCRIPTION OF EMBODIMENTS

Hereinafter, an embodiment of a work vehicle disclosed in the present application will be described in detail with reference to the accompanying drawings. The invention is not limited to the embodiment described below.

Figure 1:
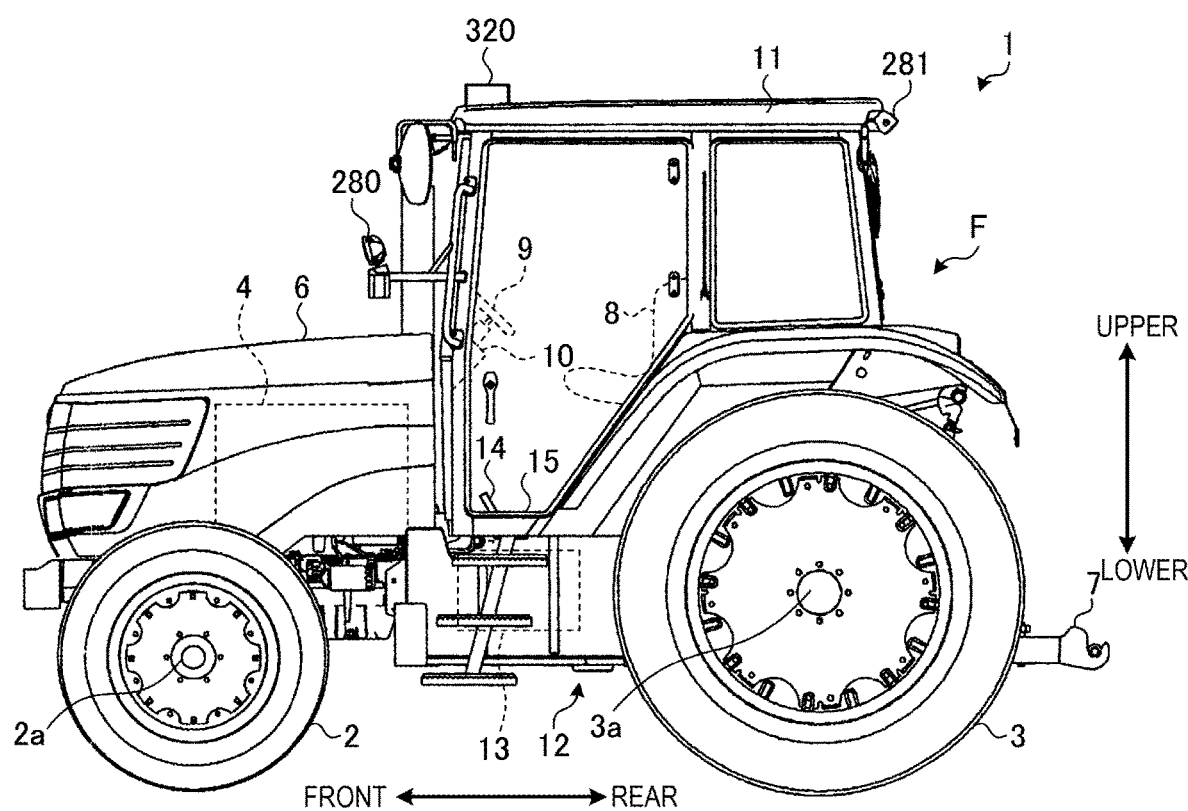
FIG. 1 is an explanatory view of a work vehicle according to an embodiment, and shows a schematic left side view of the work vehicle.

First, the overall configuration of a work vehicle 1 according to an embodiment will be described with reference to FIG. 1. FIG. 1 is an explanatory view of the work vehicle 1 according to the embodiment, and shows a schematic left side view of the work vehicle 1. In the following, a tractor will be described as an example of the work vehicle 1.

The tractor 1 is an agricultural tractor that is self-propelled by automatic operation and works in a field or the like. As will be described later, when turning near an edge of a field, the tractor 1 controls a transmission (not shown) to enable a suitable turning travel. The tractor 1 can carry out a predetermined work operation while an operator (also referred to as a worker) is on-board and the tractor 1 is running in a field.

In the following, a front and rear direction of the tractor 1 refers to a straight direction of the tractor 1. Further, in the straight direction of the tractor 1, a direction going from a driver's seat 8 to a steering wheel 9 is a forward direction of the tractor 1, and an opposite direction thereof is a reverse (backward) direction. Further, the front and rear of the tractor 1 are based on the forward direction.

Further, a left and right direction refers to a direction that is horizontally orthogonal to the front and rear direction. Here, the left and right are defined toward the "front" side in the front and rear direction. That is, with an operator seated in the driver's seat 8 and facing forward, his left hand side is "left", and his right hand side is "right." Furthermore, an upper and lower direction refers to a direction that is orthogonal to the front and rear direction and the left and right direction. Thus, the front and rear direction, the left and right direction, and the upper and lower direction are three-dimensionally orthogonal to each other.

As shown in FIG. 1, the tractor 1 includes a cabin 11, a vehicle body (e.g., a running vehicle body F), front wheels 2 and rear wheels 3 provided on the running vehicle body F and serving as running devices, an engine 4 as a driving source, a bonnet 6 covering the engine 4, a connecting device 7 for connecting a work machine, a transmission case 12 for accommodating a transmission, and a fuel tank 13 provided below the cabin 11.

The front wheels 2 are provided as a pair of left and right wheels. The front wheels 2 are rotatably connected to a front axle 2a and mainly serve as steered wheels. The rear wheels 3 are provided as a pair of left and right wheels. The rear wheels 3 are rotatably connected to a rear axle 3a and mainly serve as driving wheels.

The running mode of the tractor 1 can be switched to a two-wheel drive (2WD) mode in which the rear wheels 3 are driven via a transmission, a four-wheel drive (4WD) mode in which both the front wheels 2 and the rear wheels 3 are driven, and a front wheel acceleration mode in which the front wheels 2 are accelerated. In the case of the 4WD mode or the front wheel acceleration mode, both the front wheels 2 and the rear wheels 3 serve as driving wheels.

The bonnet 6 can pivot (can be opened and closed) in the upper and lower direction with a rear portion as a pivot center. The bonnet 6 in a closed state covers the engine 4 mounted on a vehicle body frame. The engine 4 is a drive source of the tractor 1 and is a heat engine such as a diesel engine or a gasoline engine.

An operation part in which a driver is located is provided inside the cabin 11. The operation part is provided on the running vehicle body F. The driver's seat 8, the steering wheel 9, a forward and backward pedal 14 for moving the running vehicle body F forward or backward, a floor 15 serving as a floor surface of the operation part, various levers (not shown) such as a shift lever and an auxiliary shift lever, and various pedals such as an accelerator pedal, a brake pedal and a clutch pedal are provided in the operation part. The operation part may be in a released state where it is not covered by the cabin 11.

The driver's seat 8 is a seat for a driver provided on the running vehicle body F. The steering wheel 9 can be operated by a driver to steer the front wheels 2 that are steered wheels. The steering wheel 9 is provided on a dashboard 10 provided in front of the driver's seat 8. A display unit (e.g., a meter panel) for displaying various types of information is provided on an upper surface of the dashboard 10.

The forward and backward pedal 14 is an operation pedal that is coupled to a trunnion shaft (see FIG. 2) connected to the transmission and provided for switching the transmission between a neutral position, a forward movement and a rearward movement. As will be described in detail later, the forward and backward pedal 14 has a pivot shaft 142 (see FIG. 2) provided on a floor bracket 151 (see FIG. 2) between the floor 15 and the fuel tank 13.

The transmission case 12 accommodates the transmission. The transmission appropriately decelerates power (e.g., rotational power) transmitted from the engine 4 and transmits the power to the front wheels 2 and the rear wheels 3 serving as drive wheels, and a PTO (Power Take-off) shaft (not shown). The transmission is, for example, a hydrostatic continuously variable transmission.

A work machine (not shown) that works in the field can be coupled to a rear portion of the tractor 1 via the connecting device 7. The work machine is driven by a PTO shaft (not shown) protruding rearward from the transmission case 12.

The PTO shaft transmits, to the work machine, the rotational power that is appropriately decelerated by the transmission. The work machine is lifted and lowered by a lifting device (not shown). The work machine is in a non-working position when lifted and is in a ground working position when lowered.

As the work machine, for example, a seedling transplanting machine for transplanting seedlings in a paddy field, a rotary cultivator for cultivating fields, and the like are appropriately connected. In the seedling transplanting machine, a transplant claw (not shown) rotates by the power transmitted from the PTO shaft to transplant seedlings in a field surface. Further, in the rotary cultivator, a cultivating claw (not shown) rotates by the power transmitted from the PTO shaft to cultivate a field surface (soil).

Further, the tractor 1 includes a positioning device (not shown) that functions as a position information acquisition device for acquiring position information of one's own vehicle. The positioning device can measure the position of the vehicle. The positioning device is, for example, a GNSS (Global Navigation Satellite System). As shown in FIG. 1, a reception antenna 320 constituting a part of the positioning device is provided at a front portion of the cabin 11.

Figure 2:
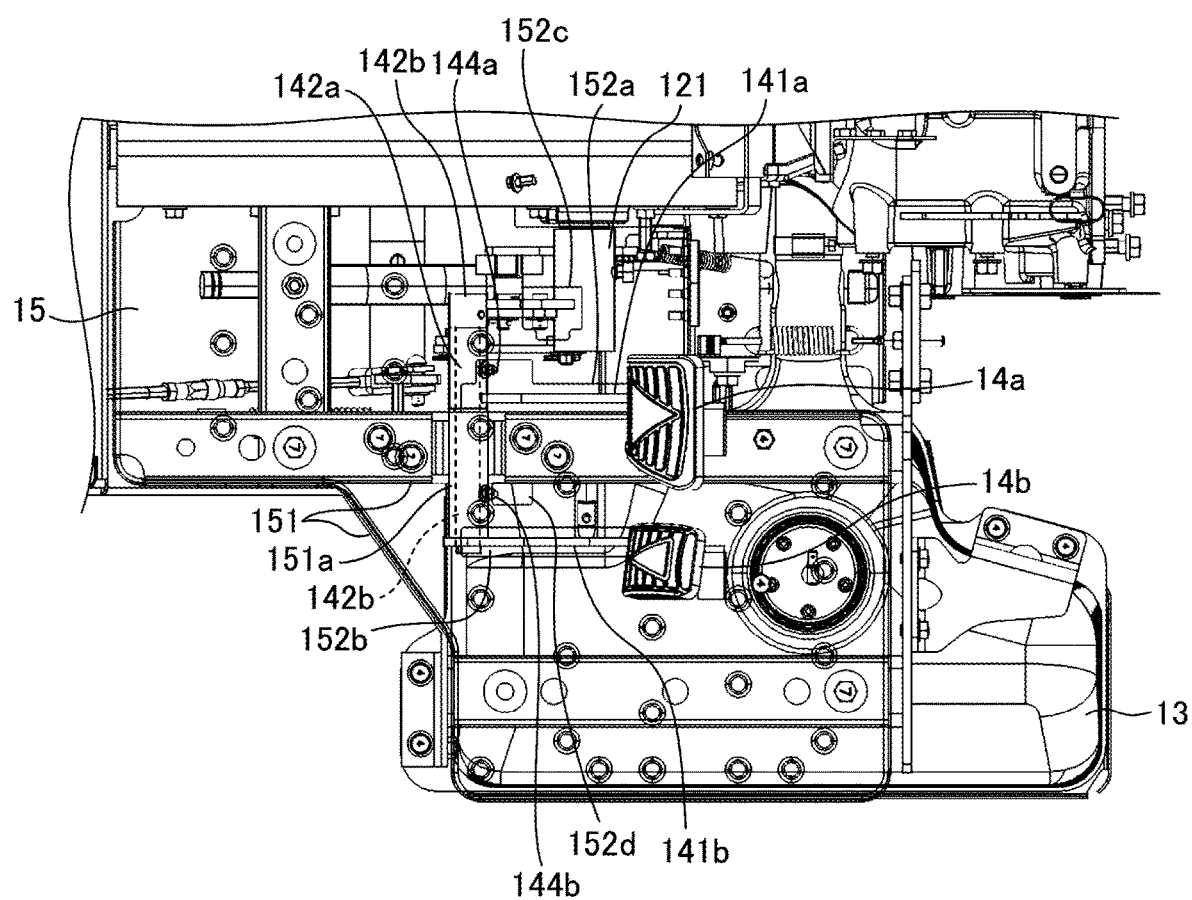
FIG. 2 is a top view of a periphery of a floor including a forward and backward pedal.
Figure 3:
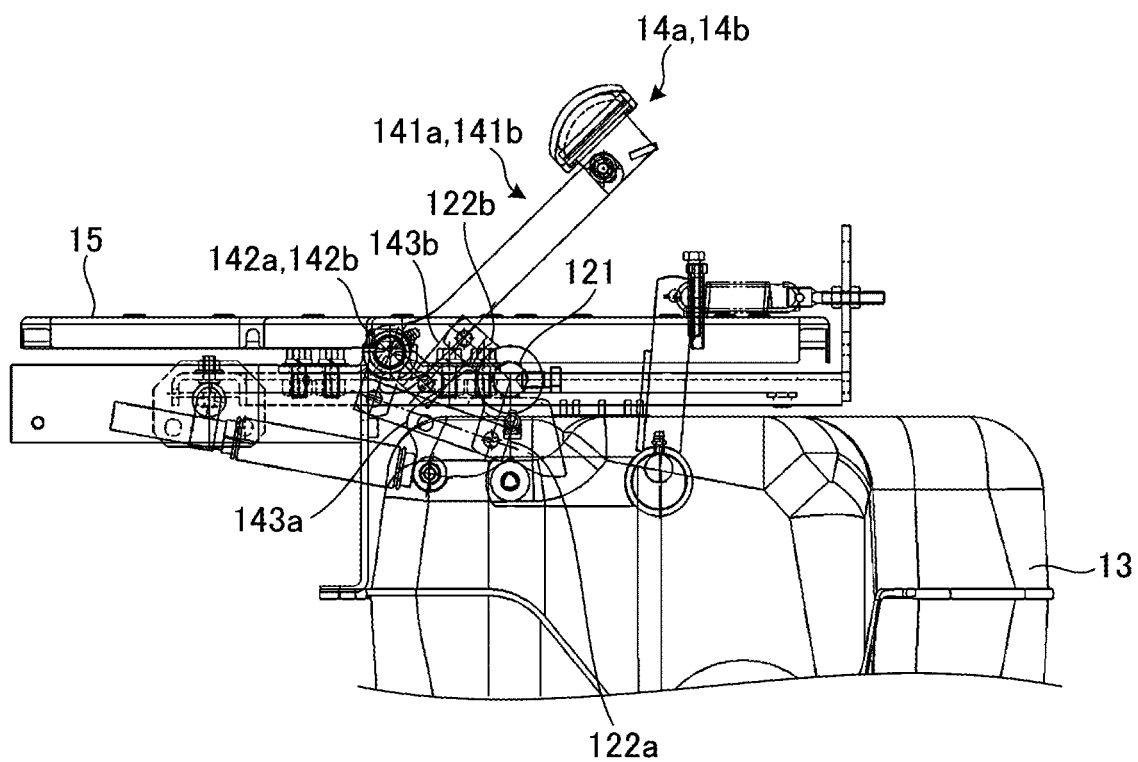
FIG. 3 is a side view of the periphery of the floor including the forward and backward pedal.
Figure 4:
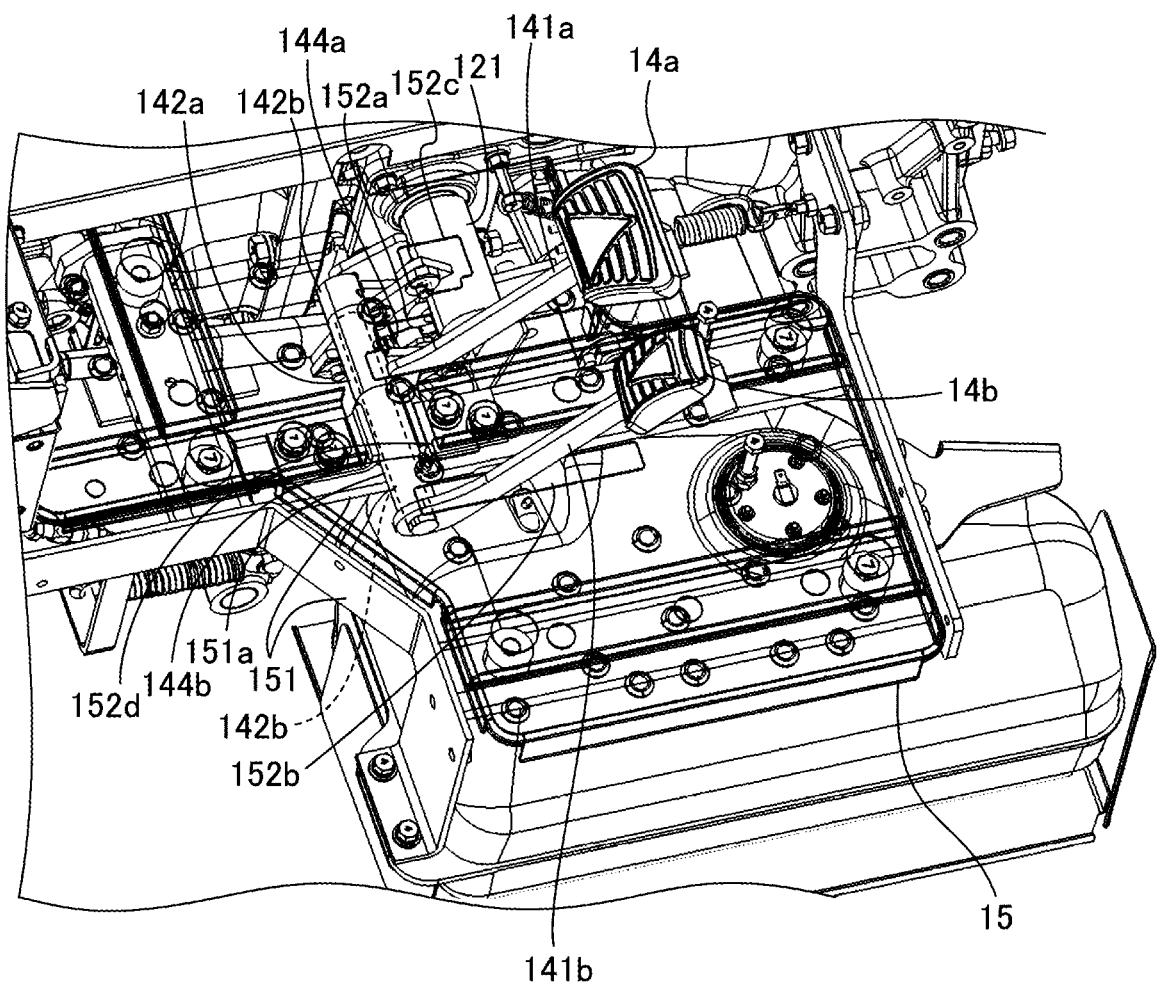
FIG. 4 is a perspective view of the periphery of the floor including the forward and backward pedal.

Subsequently, the arrangement of the forward and backward pedal 14 will be described in detail with reference to FIGS. 2 to 4. FIG. 2 is a top view of the periphery of the floor 15 including the forward and backward pedal 14, FIG. 3 is a side view of the periphery of the floor 15 including the forward and backward pedal 14, and FIG. 4 is a perspective view of the periphery of the floor including the forward and backward pedal. In FIGS. 2 and 3, the right side of the drawing is the front direction of the tractor 1, and the left side of the drawing is the rear direction of the tractor 1. In FIGS. 2 to 4, in order to facilitate understanding, the floor 15 is shown in a transparent state.

As shown in FIGS. 2, 3 and 4, the forward and backward pedal 14 includes pedal portions 14a, 14b, arm portions 141a, 141b, pivot shafts 142a, 142b, link mechanisms 143a, 143b, and a grease nipple 144.

The pedal portions 14a, 14b are members that are operated (e.g., depressed) by a driver. In FIG. 2, the forward pedal portion 14a is arranged on the left side, and the backward pedal portion 14b is arranged on the right side. The forward pedal portion 14a may be arranged on the right side, and the backward pedal portion 14b may be arranged on the left side.

The arm portions 141a, 141b are members for connecting the pedal portions 14a, 14b and the pivot shafts 142a, 142b. Specifically, the arm portions 141a, 141b are connected to the pedal portions 14a, 14b above the floor 15, extend to the lower side of the floor 15 through openings (e.g., hole portions 152a, 152b) of the floor 15, and are connected to the pivot shaft 142 below the floor 15.

The two arm portions 141a, 141b are independently connected to the two pedal portions 14a, 14b, respectively. Specifically, the first arm portion 141a connects the forward pedal portion 14a and the first pivot shaft 142a. The second arm portion 141b connects the backward pedal portion 14b and the second pivot shaft 142b.

The two pivot shafts 142a, 142b are arranged on a straight line and are provided on the floor bracket 151. The two pivot shafts 142a, 142b are configured to pivot integrally with the arm portions 141a, 141b. Specifically, the first pivot shaft 142a pivots together with the first arm portion 141a by an amount corresponding to a depressing force when the pedal portion 14a is depressed by a driver.

Further, the second pivot shaft 142b pivots together with the second arm portion 141b by an amount corresponding to a depressing force when the pedal portion 14b is depressed by a driver.

More specifically, the second pivot shaft 142b passes, for example, through the inside of the first pivot shaft 142a and the inside of a cylindrical shaft fixing portion 151a provided on the floor bracket 151, and can pivot independently of the first pivot shaft 142a. That is, the first pivot shaft 142a and the second pivot shaft 142b are pivot shafts having the same center position (are coaxial).

In this way, when the pivot shafts 142a, 142b are provided on the floor bracket 151, a dedicated member for providing the pivot shafts 142a, 142b becomes unnecessary. Therefore, in the tractor 1 according to the embodiment, the pedal 14 can be compactly arranged.

The link mechanisms 143a, 143b are members for connecting the pivot shafts 142a, 142b and arm portions 122a, 122b of a trunnion shaft 121. Specifically, the link mechanisms 143a, 143b are substantially L-shaped members. First ends of the link mechanisms 143a, 143b are connected to the pivot shafts 142a, 142b, and second ends (e.g., the other of two ends) are connected to the arm portions 122a, 122b.

Specifically, the first link mechanism 143a is arranged below the pivot shafts 142a, 142b and the trunnion shaft 121 and is configured to be convex downward. Further, the first pivot shaft 142a is fixed to one end (e.g., the first end) of the first link mechanism 143a, and the first arm portion 122a is pivotably connected to the other end (e.g., the second end) of the first link mechanism 143a.

Further, the first link mechanism 143a has an L-shape and is configured such that a portion where two sides of the L-shape overlap is pivotable. Further, the first arm portion 122a is fixedly connected to the trunnion shaft 121.

In this way, when the first pedal portion 14a is depressed, a depressing force is transmitted to the trunnion shaft 121 via the first pivot shaft 142a, the first link mechanism 143a, and the first arm portion 122a. Thereby, the trunnion shaft 121 pivots.

Further, the second link mechanism 143b is arranged between the pivot shafts 142a, 142b and the trunnion shaft 121 and is configured to be convex upward. Further, the second pivot shaft 142b is fixed to one end (e.g., the first end) of the second link mechanism 143b, and the second arm portion 122b is pivotably connected to the other end (e.g., the second end) of the second link mechanism 143b.

Further, the second link mechanism 143b has an L-shape and is configured such that a portion where two sides of the L-shape overlap is pivotable. Further, the second arm portion 122b is fixedly connected to the trunnion shaft 121.

In this way, when the second pedal portion 14b is depressed, a depressing force is transmitted to the trunnion shaft 121 via the second pivot shaft 142b, the second link mechanism 143b, and the second arm portion 122b. Thereby, the trunnion shaft 121 pivots.

Further, as shown in FIG. 3, a connection portion between the second link mechanism 143b and the second arm portion 122b is located close to the floor 15. In other words, there is a possibility that the connection portion and the floor 15 may contact in an operation range of the second arm portion 122b. The operation range of arm portions (e.g., the first arm portion 122a or the second arm portion 122b) may correspond to the range through which the arm portion travels during operation.

Therefore, the floor 15 has an opening (e.g., a hole portion 152c) provided at a position corresponding to the operation range of the second arm portion 122b. In this way, the second arm portion 122b passes through the hole portion 152c when it is operated. As a result, it is possible to prevent the second arm portion 122b and the floor 15 from coming into contact with each other and interfering with each other. Instead of the hole portion, the position of the floor 15 corresponding to the operation range of the second arm portion 122b may be configured to have a convex shape.

Further, as shown in FIG. 2, the pedal 14 is provided with grease nipples 144a, 144b for supplying grease to the pivot shafts 142a, 142b.

Specifically, the first grease nipple 144a is a portion that is provided on the first pivot shaft 142a and configured to supply grease to the first pivot shaft 142a. The second grease nipple 144b is a portion that is provided on the second pivot shaft 142b and configured to supply grease to the second pivot shaft 142b.

Further, the two grease nipples 144a, 144b are arranged, for example, facing obliquely forward. Further, a part of the hole portion 152a and a hole portion 152d are provided at positions of the floor 15 corresponding to the grease nipples 144a, 144b. In this way, an operator (driver or the like) can easily supply grease to the pivot shafts 142a, 142b.

As described above, the tractor 1 according to the embodiment includes the running vehicle body F, the floor 15 provided on the running vehicle body F and serving as a floor surface of the operation part in which a driver is located, the floor bracket 151 configured to support the floor 15, and the fuel tank 13 provided below the floor 15. The tractor 1 includes the pedal 14 configured to move the running vehicle body F forward or backward and having the pivot shafts 142a, 142b provided on the floor bracket 151 between the floor 15 and the fuel tank 13. In this way, the pedal 14 can be compactly arranged.

Further, the pedal 14 is provided with the grease nipples 144a, 144b for supplying grease to the pivot shafts 142a, 142b. The floor 15 is provided with the hole portions at positions corresponding to the grease nipples 144a, 144b. In this way, an operator can easily supply grease to the pivot shafts 142a, 142b.

Further, the tractor 1 further includes the hydrostatic continuously variable transmission having the trunnion shaft 121 provided below the floor 15. The trunnion shaft 121 is connected to the arm portions 122a, 122b. The pedal 14 includes the link mechanisms 143a, 143b that connect the arm portions 122a, 122b and the pivot shafts 142a, 142b. The floor 15 has the hole portion 152c at a position corresponding to the operation range of the arm portions 122a, 122b. In this way, it is possible to avoid interference between the arm portion 122a and the floor 15 due to contact or the like.

Further effects and modifications can be easily derived by those skilled in the art. Therefore, the broader aspects of the invention are not limited to the particular details and representative embodiments shown and described above. In this way, various changes can be made without departing from the gist or scope of the general inventive concepts as may be defined by the claims and their equivalents.

1 Tractor (Work vehicle)
2 Front wheel
3 Rear wheel
4 Engine
6 Bonnet
7 Connecting device
8 Driver's seat
9 Steering wheel
10 Dashboard
11 Cabin
12 Transmission case
13 Fuel tank
14 Forward and backward pedal
15 Floor
121 Trunnion shaft
142 Pivot shaft
151 Floor bracket
F Running vehicle body

What is claimed is:

1. A work vehicle comprising:
a vehicle body;
a floor provided on the vehicle body and serving as a floor surface of an operation part configured to support an operator;
a floor bracket configured to support the floor;
a fuel tank provided below the floor;
a pedal configured to move the vehicle body forward or backward and comprising pivot shafts provided on the floor bracket between the floor and the fuel tank,
wherein the pedal is provided with grease nipples configured to supply grease to the pivot shafts, and
wherein the floor is provided with openings at positions corresponding to the grease nipples.

2. The work vehicle according to claim 1, further comprising:
a hydrostatic continuously variable transmission comprising a trunnion shaft provided below the floor,
wherein the trunnion shaft is connected to an arm portion,
wherein the pedal comprises a link mechanism that connects the arm portion and one of the pivot shafts, and
wherein the floor has an opening at a position corresponding to an operation range of the arm portion.

3. The work vehicle according to claim 1, wherein the grease nipples face obliquely forward.

* * * * *